United States Patent [19]
Brown

[11] Patent Number: 4,987,801
[45] Date of Patent: Jan. 29, 1991

[54] METHOD AND APPARATUS FOR STRIPPING A WIRE END

[76] Inventor: Joseph E. Brown, 4603 Candlelight La., Apt. 5, Liverpool, N.Y. 13090

[21] Appl. No.: 439,195

[22] Filed: Nov. 20, 1989

[51] Int. Cl.$^5$ .............................................. H02G 1/12
[52] U.S. Cl. ...................................................... 81/9.4
[58] Field of Search .................... 81/9.4, 9.51; 30/90.1

[56] References Cited

U.S. PATENT DOCUMENTS

| | | | |
|---|---|---|---|
| 3,074,301 | 1/1963 | Carpenter | 81/9.51 |
| 4,019,409 | 4/1977 | McKeever | 81/9.51 |
| 4,478,110 | 10/1984 | Undin et al. | 81/9.51 |

FOREIGN PATENT DOCUMENTS

| | | | |
|---|---|---|---|
| 3611365 | 10/1987 | Fed. Rep. of Germany | 81/9.51 |
| 433578 | 6/1974 | U.S.S.R. | 81/9.4 |

Primary Examiner—Roscoe V. Parker
Attorney, Agent, or Firm—Wall and Roehrig

[57] ABSTRACT

A rotary wire end stripper has a rotatable cutting head which has a cutting blade carrier block that slidably reciprocates between an operative and inoperative position along a diameter of the cutting head. The carrier block is spring-biased to the inoperative position and has a weight that is positioned to move the carrier block to the operative position under the centrifugal force of rotation of the cutting head. The cutting head forms annular slits of predetermined depth in the coverings of the wire which forms annular "slugs" that are removed after the wire end is withdrawn from the device.

13 Claims, 3 Drawing Sheets

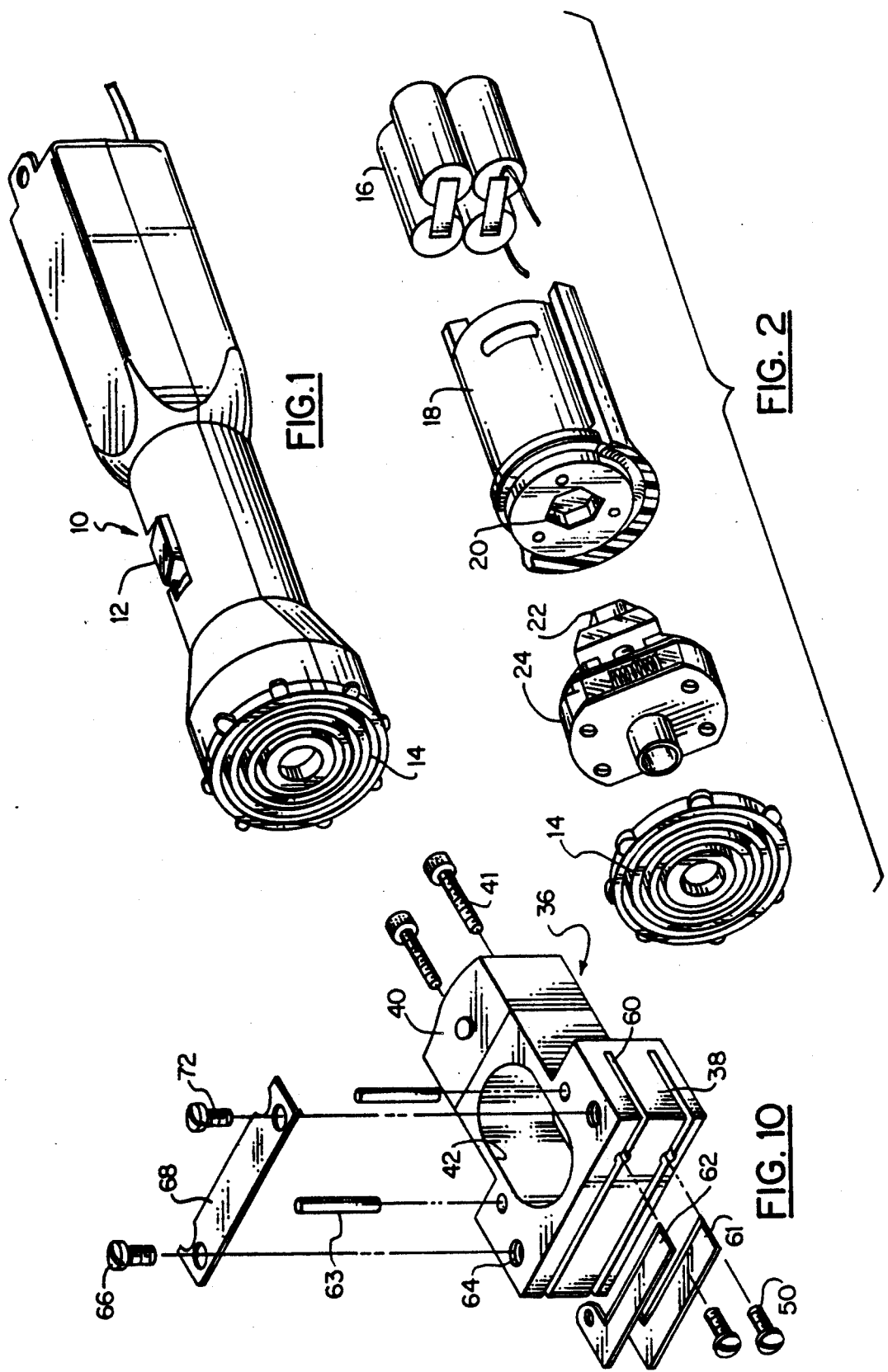

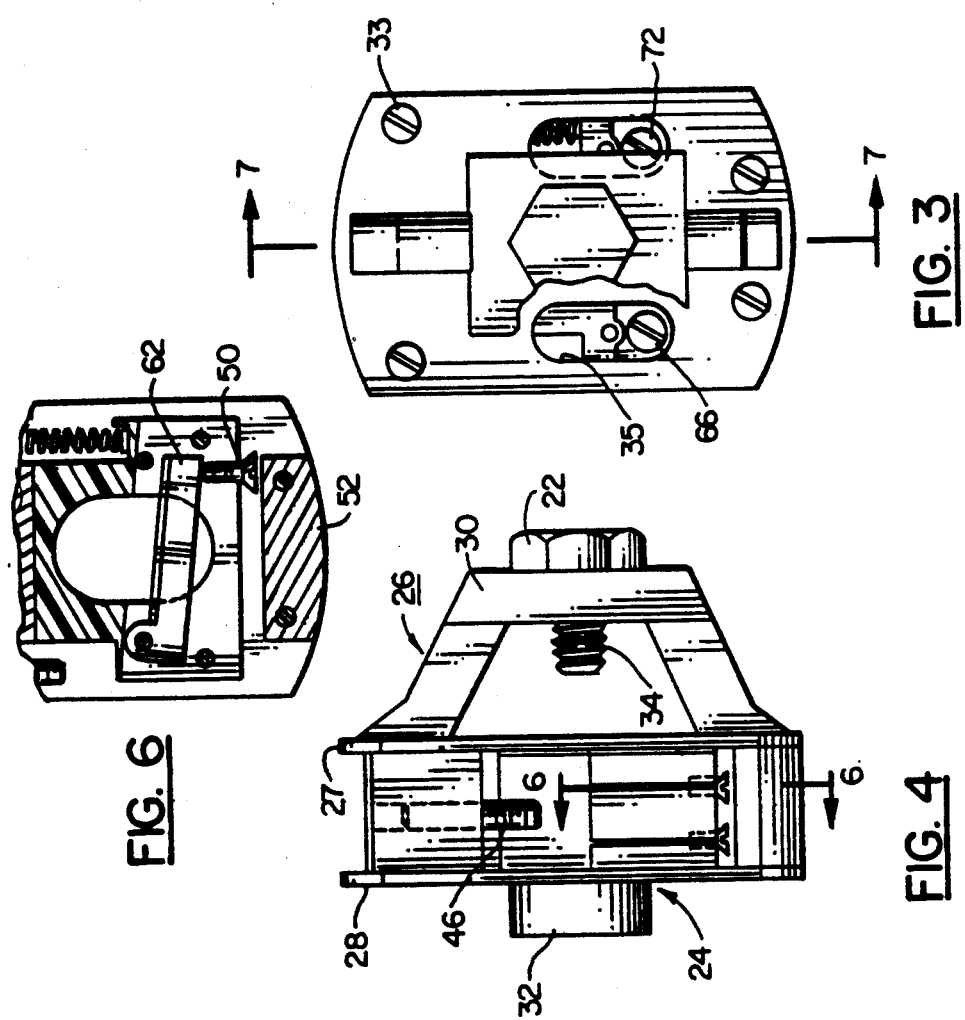

METHOD AND APPARATUS FOR STRIPPING A WIRE END

BACKGROUND OF THE INVENTION

This invention relates to methods and apparatus for stripping end portions of wires and cables, and more particularly to stripping the various layers of insulation and conductive shield material from a center conductor cable such as coaxial cable and the like.

Coaxial cable such as those used in transmitting data, television signals and computer network signals usually have a center conductor encapsulated in a dielectric material that is overlaid with a conducting shielding layer, all of which is usually encased in an outer protective jacket. In order to connect one end of a cable to another, a termination must be fixed mechanically and electrically to the conductive portions of the cable to permit connection to terminal strips and other cable ends. Independent electrical connections to both the center conductor and electrically shielding layers must be established to permit functioning of the cable.

Insulations and shields are of wide varieties and types of materials and pose a significant problem in the industry in their removal for good electrical connections. While stripping of these materials may be done manually, it is a very tedious and difficult job and frequently the conductor or shield is either nicked or severed in an unwanted fashion so as to seriously affect the electrical properties thereof. This is particularly important in the high-speed data transmission type of cable where conductors tend, at high frequencies, to carry most of their electrical information on the surface of the conductor and even a small scratch or nick can seriously interrupt the flow of electrical information.

For this reason, power operated rotary strippers have been developed for accurately and quickly stripping the ends of coaxial type wires and cables. These have generally involved apparatus such as that shown in U.S. Pat. No. 3,074,301 to Carpenter which has one or two pivotally mounted blades adapted to pivot out of the way as the wire is inserted into the device and then to cam into single cut cutting position as the cutting head is rotated and the wire end is withdrawn from the device. These devices have generally worked well for the removal of a single segment of the outer covering and have usually necessitated the use of multiple devices to remove the several layers of different material from a conductor.

Attempts have been made to remove two or more segments from the end of a multi-layered conductor, but they have generally encountered the insurmountable problem of the removal from the cutting device of the one or more "slugs" remaining after cutting the various layers of the wire coverings. Two and three bladed strippers have been attempted, however, none have been successful because of continual jamming caused by the "slugs" hanging up between the knives within the rotary cutting head.

OBJECTS AND SUMMARY OF THE INVENTION

It is an object of the present invention to facilitate stripping multiple slugs of insulating and shielding material from a central conductor without the drawbacks of the prior art.

It is another object of the present invention to provide a powered wire end stripping device for precisely slitting the various layers of materials surrounding a central conductor so as to permit removal of the layers without injury to the conducting members of the cable.

It is another object of the present invention to provide a device for quickly and accurately removing the insulation and shielding of a coaxial cable in precise discreet segments.

It is another object of the present invention to provide a device that will rapidly and accurately cut the insulation, shielding and protective coating of a coaxial cable, each to its appropriate depth for removal therefrom without jamming of the slugs in the device.

It is another object of the present invention to provide a device for accurately and quickly slitting annular rings of a precise depth equal to the particular layer of insulating and/or shielding material to be removed, simultaneously along the end of a coaxial-type cable.

It is a further object of the present invention to provide a compact, portable field use unit for stripping the ends of coaxial-type cables.

In one form of the present invention a rotary cutter head is provided with a slidably mounted knife carrier that is brought into cutting contact with the insulation and shielding layers to be cut by centrifugal action as the cutter head is rotated to quickly and accurately form annular slits of precisely desired depth in the cable coverings to facilitate later removal of the slit portions.

BRIEF DESCRIPTION OF THE DRAWINGS

These and other objects, features and advantages of this invention will be more fully understood from the ensuing detailed description of the preferred embodiment of the invention which description should be read in conjunction with the accompanying drawings, wherein:

FIG. 1 is a perspective view of a device embodying the present invention;

FIG. 2 is a view similar to FIG. 1, partially exploded to show the cutting head of the present invention;

FIG. 3 is a bottom plan view of the cutter head in the stationary position;

FIG. 4 is a left side elevational view of FIG. 3;

FIG. 5 is a right side elevational view of the blade carrier of FIG. 3.

FIG. 6 is a sectional view on line 6—6 of FIG. 4;

FIG. 10 is an exploded view of the cutting blade carrier block showing the mounting means for the cutting blades.

DETAILED DESCRIPTION OF THE PREFERRED EMBODIMENT

Figure 12:
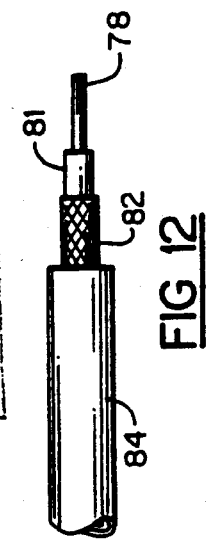
FIG. 12 is a view similar to FIG. 11 showing the insulation and shield "slugs", that were slit in FIG. 11.

Referring now to FIG. 1, there is shown a portable battery operated wire stripper embodying the present invention. The stripper 10 is of a type generally available which has a battery pack to operate the device which may be recharged by plugging into a suitable charging device. Stripper 10 has an on/off switch 12 and a wire guide/safety cover 14 removably attached at the cutter head end of the stripper 10 to guide the wire end to be stripped properly into the cutter head and to protect the operator from the rotating cutter head.

As may be seen in FIG. 2, the device consists generally of the power pack 16, the drive motor assembly 18 which has a gear reducer (not shown) and hex drive receptacle 20 in the driven end thereof adapted to receive therein the hexagonal projection 22 on the bottom of the cutting head 24 as may be seen more clearly in FIGS. 3–5 herein.

Referring to FIG. 4, the cutter head 24 comprises generally a frame portion 26 which consists of a pair of flat plates 27 and 28 joined together about a core 29 to define a radial chamber adapted to slidably receive therein a cutting blade carrier block 36. A yoke portion 30 is mounted on plate 27 and carries on its outer extremity the nut 22 which meshes with the drive unit's hexagonal receptacle 20. The other plate 28 carries a central wire guide member 32 which extends into one side of the cutting aperture of the stripping head to form a support against which the cutting action takes place. The yoke 30 has threadably inserted through the hexagonal projection 22 an adjustable threaded stop 34 which may be adjusted to limit the distance the wire end can be inserted into the cutter head.

Core 29 consists essentially of counterbalance weight 52 and blocks 31 secured to the plates 27 and 28 by screws 33. Plate 27 also has a pair of slots 35 for the heads of screws 66 and 72 which allow clearance for movement of the blade carrier block assembly 36 in its radial motion in the core 29.

Figure 8:
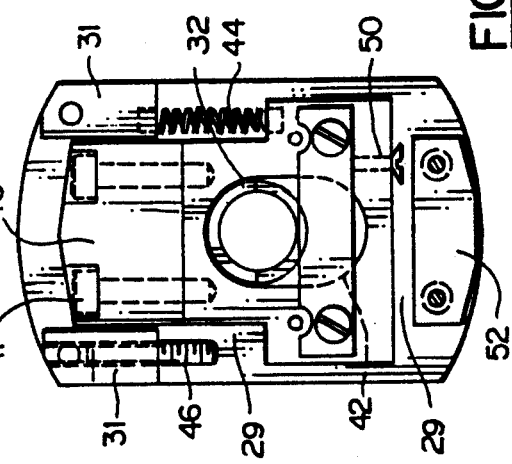
FIG. 8 is a sectional view on line 8—8 of FIG. 7.

Mounted between the plates 27 and 28 in the radial chamber of core 29 is a cutting blade carrier block assembly 36 which can be seen in more detail in FIGS. 8 and 10. The cutting block assembly 36 comprises generally central elliptical opening 42 which surrounds the wire cutting operational area and allows the wire end from outside of the stripper 10 to be inserted to contact the stop 34 when the device is not energized. A blade clamping and mounting block 38 is fashioned on one side of the opening 42 and a centrifugal weight 40 is mounted by bolts 41 in the opposite side. The block 38 can carry anywhere from one to four blades, as desired and it has a series of support and clamping devices as shown in FIG. 10 and as will be described in detail in connection therewith. The assembly 36 is slidably mounted between the plates 28 in the cutting head and is spring urged to the position shown in FIGS. 5–8 by the spring 44. An adjustable stop 46, as may be seen in FIGS. 4–8, is provided to limit the movement of the block in the actuated direction and to accurately control the depth of cut of the cutting blades positioned in the clamping section 38.

Referring now to FIGS. 6 and 10, there is shown a cutting block assembly 36. The upper surface of block 36 in FIG. 10 is the inner or bottom surface when assembled in the wire stripper 16. The blade clamping and mounting end 38 has two cutting blades 61 and 62 pivotally mounted about pin 63 and held in slots 60 by stop screws 50. The blades 61 and 62 are accurately positioned in the slots by stop screws 50, as shown in FIG. 6, resulting in the precise position of the cutting blades to permit slitting to the exact desired depth. Precise depth of cut is extremely important in coaxial cables for data transmission and similar uses as described above.

Figure 11:
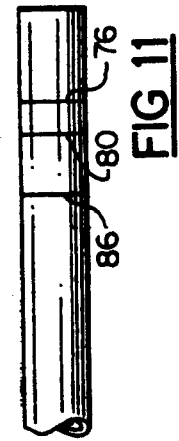
FIG. 11 is a view of a wire end cut in accordance with the present invention.

A third blade 68 is mounted on the top surface of block 38 (FIG. 10) by screws 66 and 72. Blade 68 is fixed to cut through the insulation and shielding layers of the wire end to form cut 76 in the wire end without nicking the center conductor 78 (FIGS. 11 and 12). Blade 62 adjacent to blade 68 is positioned to make cut 80 which leaves the inner insulation layer 81 intact, but cuts the shield 82 and outer covering 84. The blade 61 cuts only the outer covering 84 at 86 to expose the shield 82.

It will be understood that each blade will be set to cut to the desired depth and the spacing between the blades will be set for the particular wire end termination desired.

Figure 7:
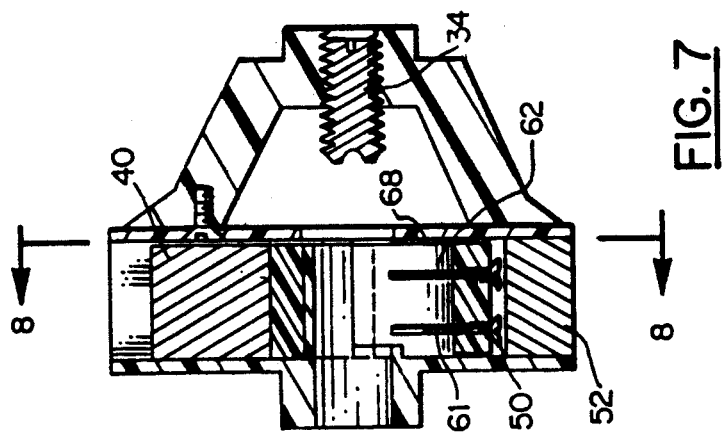
FIG. 7 is a sectional view on line 7—7 of FIG. 3.

Referring now to FIGS. 7 and 8, the cutter blade carrier block 36 is shown in the de-energized position with clear access for the wire end to be inserted through the cutting head in supporting alignment on wire guide 32 to abut adjustable stop 34. The blade assembly is spring urged into the position shown in FIG. 7 and 8 by the spring 44 as previously described. This limit of movement is determined by the butting of the inside of opening 42 against the outside of wire guide member 32 which stops movement of the block in the downward direction in FIGS. 7 and 8, and is not critical as long as the cutters are withdrawn from the opening in guide 32. Counter-balance weight 52 is chosen to counter-balance the centrifugal weight 40 when the head 24 is rotated to cause the knives to move to the full cutting position to cut the insulation and shielding of the wire end.

Figure 9:
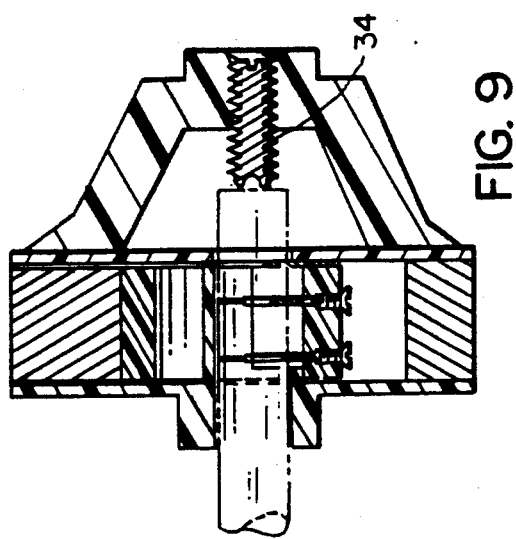
FIG. 9 is a sectional view similar to FIG. 7 showing the blade carrier in the cutting position.

When being rotated, the cutting blades are in the position shown in FIG. 9 as the carrier block 36 has been moved to the other end of the diameter of its radial sliding track by the centrifugal force of rotation. The centrifugal block 40 has caused the cutting block assembly 36 to move to the upper end of FIG. 9 forcing the cutting blades into the various layers of covering of the wire end. The stop 46 shown in FIG. 8 is positioned to limit the penetration of the cutting blades in the clamping head 38, to the desired penetration of the wire end to make an annular slit around the wire to the desired depth for cutting the various layers of insulation and shielding for later removal without nicking or damaging the next inner layer.

In operation, a wire end is inserted into the device through the cover 14 until the wire end abuts the stop screw 34 as may be seen best in FIG. 9. At this point the switch 12 is actuated and the cutting head 24 is rotated which, as previously described causes the centrifugal weight 40 to pull the cutting knives into cutting contact with the insulation and shielding layers of the wire end. This results in a series of annular slits being cut in the wire end as may be seen in FIG. 11 which severs the various layers to the desired depth. The switch 12 is deactivated and after the rotation stops, the wire end is removed.

When rotation of cutting head 24 stops, the spring 44 retracts the cutting blades from the insulation and this allows the wire end to be removed without attempting to pull off the cut "slugs" which might damage the cutting blades or become jammed between the cutting blades, causing problems in the next cutting operation. After the wire end is withdrawn from the cutting head, the slit layers of insulation and shielding can be easily removed by hand or by another device to prepare the wire end for termination.

There is thus provided a very fast accurate and precise cutting head for slitting insulation and shielding layers about a wire end to a precise depth to permit stripping thereof in preparation for termination in a connector device.

While the invention has been described in the specification and illustrated in the drawings with reference to a preferred embodiment, it will be understood by those skilled in the art that various changes may be made and equivalents may be substituted for elements of the invention without departing from the scope of the claims.

What is claimed is:

1. In a rotary wire stripper for stripping an end of a coaxial cable of the type having a center conductor encapsulated in one or more layers of insulation and conductive shields, the combination comprising:
    a rotary cutting head having a central wire end receiving aperture therein;
    a cutting blade carrier block mounted in said cutting head for reciprocal sliding motion along a diameter of said cutting head;
    a central aperture in said carrier block in axial alignment with the axis of said cutting head;
    at least one cutting blade mounted in said carrier block projecting into said central aperture;
    an actuating weight mounted on said carrier block on the opposite side of the axis of said cutting head from said cutting blade;
    means urging said carrier block to one end of said diameter to hold said cutting blade in the inoperative position; and
    means for rotating said rotary cutting head so that upon rotation of said cutting head said carrier block is propelled to the other end of said diameter to engage said cutting blade with a wire end positioned in said wire end receiving aperture.

2. The rotary wire stripper of claim 1 further defined by stop means for limiting the insertion of a wire end in said central receiving aperture and stop means on said rotary cutting head limiting the travel of said carrier block to position said wire end and said cutting blade in the desired slitting position.

3. The rotary wire stripper of claim 2 wherein a counter balance weight is mounted in said carrier block so that upon rotation said rotary cutting head is balanced when said coactuating weight is fully displaced.

4. The rotary wire stripper of claim 1 wherein two cutting blades are mounted in said carrier block at mutually different axial and radial positions relative to the axis of said frame member.

5. The rotary wire stripper of claim 1 wherein three cutting blades are mounted in said carrier block at mutually different axial and radial positions relative to the axis of said frame member.

6. A rotating wire stripper as defined in claim 1 further defined by a guide sleeve mounted in said frame member having a semi-cylindrical wire end supporting surface in axial alignment with the axis of said frame member and extending into said elongated central aperture of said carrier block.

7. In a rotary wire stripper for stripping an end of a coaxial cable of the type having a center conductor encapsulated in one or more layers of insulation and conductive shields, a rotary cutting head comprising:
    a generally cylindrical form frame member adapted to be rotated about the axis thereof;
    a cutting blade carrier block mounted for reciprocal sliding motion along a diameter of said frame member in a plane perpendicular to the axis thereof;
    an elongated central aperture in said carrier block in axial alignment with the axis of said frame member;
    a plurality of cutting blades mounted in said carrier block and projecting into said central aperture;
    a centrifugal weight mounted on said carrier block opposite said cutting blade;
    a guide sleeve mounted in said frame member having a semi-cylindrical wire end supporting surface in axial alignment with the axis of said frame member and extending into said elongated central aperture of said carrier block; and
    means for rotating said frame member so that upon rotation of said frame member centrifugal force causes said centrifugal weight to move said carrier block radially outwardly causing said cutting blade to cut into the encapsulating layers of a wire end disposed in said guide sleeve.

8. The rotary wire stripper of claim 6 further defined by spring means mounted between said carrier block and said frame member to hold said carrier block and blade out of contact with a wire end disposed in said rotary cutting head when said head is stationary.

9. A device as described in claim 6 further defined by adjustable stop means mounted in said frame member to axially position a wire to be stripped relative to said blades.

10. A device as described in claim 7 further defined by adjustable stop means mounted in said frame member to limit radial movement of said blade carrier block to precisely control the depth of cutting of said cutting blades.

11. The rotary wire stripper of claim 7 wherein two cutting blades are mounted in said carrier block at mutually different axial and radial positions relative to the axis of said frame member.

12. The rotary wire stripper of claim 7 wherein three cutting blades are mounted in said carrier block at mutually different axial and radial positions relative to the axis of said frame member.

13. The method of stripping an end of a coaxial cable of the type having a center conductor encapsulated in one or more layers of insulation and conductive shields which comprises the steps of:
    inserting a wire end to be stripped into an annular recess in a rotary cutting device;
    rotating said rotary cutting device about said wire end;
    moving by the centrifugal force of said rotation a plurality of cutting blades slidably mounted in said rotary cutting device along a diameter of said rotary cutting device into cutting engagement with said wire end;
    cutting a plurality of annular slits in the layers of material encapsulating said wire end;
    stopping the rotation of said rotary cutting device;
    withdrawing said cutting blades from engagement with said wire end;
    withdrawing the wire end from said annular recess; and
    removing the annularly slit portions of the layers of insulation and shields from said wire end.

* * * * *